United States Patent
Kweon et al.

(10) Patent No.: US 6,846,592 B2
(45) Date of Patent: Jan. 25, 2005

(54) POSITIVE ELECTRODE FOR RECHARGEABLE LITHIUM BATTERIES AND METHOD OF THE SAME

(75) Inventors: Ho-Jin Kweon, Cheonan (KR); Jun-Won Suh, Cheonan (KR); Sang-Won Lee, Cheonan (KR)

(73) Assignee: Samsung SDI, Co. Ltd., Suwon-si (KR)

( * ) Notice: Subject to any disclaimer, the term of this patent is extended or adjusted under 35 U.S.C. 154(b) by 149 days.

(21) Appl. No.: 10/072,923

(22) Filed: Feb. 12, 2002

(65) Prior Publication Data

US 2003/0003352 A1 Jan. 2, 2003

(30) Foreign Application Priority Data

Apr. 2, 2001 (KR) ......................................... 2001-17299

(51) Int. Cl.[7] .................................................. H01M 4/62
(52) U.S. Cl. .............................. 429/231.95; 429/218.1; 429/224; 29/623.5
(58) Field of Search ................................ 429/137, 209, 429/218.1, 218.2, 231.2, 231.5, 231.95, 232, 245, 224; 427/215, 299; 29/623.5

(56) References Cited

U.S. PATENT DOCUMENTS

| | | | |
|---|---|---|---|
| 5,200,282 A | * | 4/1993 | Ohnishi et al. ............. 429/223 |
| 5,292,601 A | | 3/1994 | Sugeno et al. |
| 5,705,291 A | * | 1/1998 | Amatucci et al. ........... 429/137 |
| 5,783,328 A | * | 7/1998 | Wang .......................... 429/137 |
| 6,558,844 B2 | * | 5/2003 | Howard et al. ........... 429/231.1 |
| 6,682,586 B2 | * | 1/2004 | Frame et al. ................. 75/658 |
| 2002/0071913 A1 | * | 6/2002 | Jen ............................. 427/299 |
| 2002/0076486 A1 | * | 6/2002 | Kweon et al. ........... 427/126.1 |

* cited by examiner

Primary Examiner—Frankie L. Stinson
Assistant Examiner—Monique Wills
(74) Attorney, Agent, or Firm—Staas & Halsey LLP

(57) ABSTRACT

A positive electrode for a rechargeable lithium battery of preparing the same. The positive electrode includes a current collector, a positive active material layer coated on the current collector, and a surface-treatment layer. The positive active material layer includes a positive active material. The surface-treatment layer includes a compound selected from the group consisting of a coating-element-included hydroxide, a coating-element-included oxyhydroxide, a coating-element-included oxycarbonate, a coating-element-included hydroxycarbonate, and a mixture thereof. The positive electrode is prepared by coating a current collector with a positive active material composition to form a positive active material layer, and treating the current collector coated with the positive active material layer with a coating liquid, and drying the treated current collector. The coating liquid includes a coating element or coating-element-included compound.

23 Claims, 3 Drawing Sheets

POSITIVE ELECTRODE FOR RECHARGEABLE LITHIUM BATTERIES AND METHOD OF THE SAME

CROSS REFERENCE TO RELATED APPLICATION

This application is based on Korean Patent Application No. 2001-17299, which was filed in the Korean Industrial Property Office on Apr. 2, 2001, the disclosure of which is incorporated herein by reference.

BACKGROUND OF THE INVENTION

1. Field of the Invention

The present invention relates to a positive electrode for a rechargeable lithium battery and a method of preparing the same, and more particularly, to a positive electrode for a rechargeable lithium battery having improved capacity, power, and cycle-life characteristics, and a method of preparing the same.

2. Description of the Related Art

Rechargeable lithium batteries use a material from or into which lithium ions are deintercalated or intercalated for positive and negative active materials. A lithium salt solution in an organic solvent or a polymer is used as an electrolyte. Rechargeable lithium batteries produce electric energy as a result of changes in the chemical potentials of the active materials during the intercalation and deintercalation reactions of the lithium ions. A rechargeable lithium battery having an average discharge voltage of approximately 3.7 V is considered to be one of the essential components in the digital generation since it is an indispensable energy source for portable digital devices, such as cellular phones, notebook computers, and camcorders (i.e., the so called "3C" devices).

For the negative active material in the rechargeable lithium battery, metallic lithium was used in the early days of development. Recently, however, since the metallic lithium causes problems such as a short life due to a high reactivity toward the electrolyte and the formation of lithium dendrites, carbon materials, such as amorphous carbon or crystalline carbon based materials, which reversibly intercalate lithium ions, are extensively used instead of the metallic lithium. With the use of carbon-based active materials, the battery performance has been improved tremendously. The short life and safety problems due to the metallic lithium has been prevented, relatively high energy density of the battery has been achieved, and cycle-life characteristics are also improved. It has also been suggested to add additives, such as boron, to the carbonaceous material, especially by coating. For example, a boron-coated graphite (BOC) improves the performance characteristics of the carbonaceous materials.

For the positive active material in the rechargeable lithium battery, chalcogenide compounds into or from which lithium ions are intercalated or deintercalated are used. Typical examples thereof include $LiCoO_2$, $LiMn_2O_4$, $LiNiO_2$, $LiNi_{1-x}Co_xO_2$ ($0<x<1$), and $LiMnO_2$. A manganese-based positive active material, such as $LiMn_2O_4$ or $LiMnO_2$, is readily prepared, is less expensive than the other materials, and is environmentally friendly. However, the manganese-based materials have a disadvantage of a relatively low capacity. $LiNiO_2$ is inexpensive and has a high capacity, but is difficult to prepare in the desired structure. Among these materials, $LiCoO_2$ is the most accepted in the battery market since its overall performance characteristics are better than the others. Accordingly, most of the current commercially available rechargeable lithium batteries (approximately 95%) use $LiCoO_2$ as the positive active material, but it is rather expensive.

There is a great deal of effort being exerted to find an alternative thereof in order to reduce the cost of the active material. For example, in U.S. Pat. No. 5,292,601, $Li_xMO_2$ (wherein M is an element selected from Co, Ni, or Mn; x is 0.5–1) is suggested as an alternative to $LiCoO_2$ as a positive active material. U. S. Pat. No. 5,705,291 also discloses a method of fabricating a rechargeable lithiated intercalation battery including the operations of mixing a coating composition including boron oxide, boric acid, lithium hydroxide, aluminum oxide, lithium aluminate, lithium metaborate, silicon dioxide, lithium silicate, or mixtures thereof with a lithiated intercalation compound particulate, and fusing the coating compound at a temperature in excess of about 400° C. so as to coat the particulate with the fused coating compound.

However, there are continuing demands for further improved positive active materials especially for improvements in power and cycle-life characteristics.

SUMMARY OF THE INVENTION

It is an object of the present invention to provide a positive electrode for a rechargeable lithium battery cell exhibiting improved cycle-life characteristics, enhanced power, and enhanced specific capacity.

It is another object of the present invention to provide a method of preparing the same.

Additional objects and advantages of the invention will be set forth in part in the description which follows and, in part, will be obvious from the description, or may be learned by practice of the invention.

In order to achieve the above and other objects, a positive electrode for a rechargeable lithium battery according to an embodiment of the invention includes a current collector, a positive active material layer coated on the current collector, and a surface-treatment layer of the positive active material layer, where the positive active material layer includes a positive active material, and the surface-treatment layer includes at least one compound selected from the group consisting of a coating-element-included hydroxide, a coating-element-included oxyhydroxide, a coating-element-included oxycarbonate, a coating-element-included hydroxycarbonate, and a mixture thereof.

According to an embodiment of the invention, a method of preparing a positive electrode for a rechargeable lithium battery includes coating a current collector with a positive active material composition to form a positive active material layer on the current collector, treating the coated current collector with a coating liquid to prepare the positive electrode, drying the treated positive electrode, where the coating liquid includes a coating-element source.

BRIEF DESCRIPTION OF THE DRAWINGS

A more complete appreciation of the invention, and many of the attendant advantages thereof, will be more readily apparent as the same becomes better understood by reference to the following detailed description when considered in conjunction with the accompanying drawings, wherein.

DETAILED DESCRIPTION OF THE EMBODIMENTS

Figure 1:
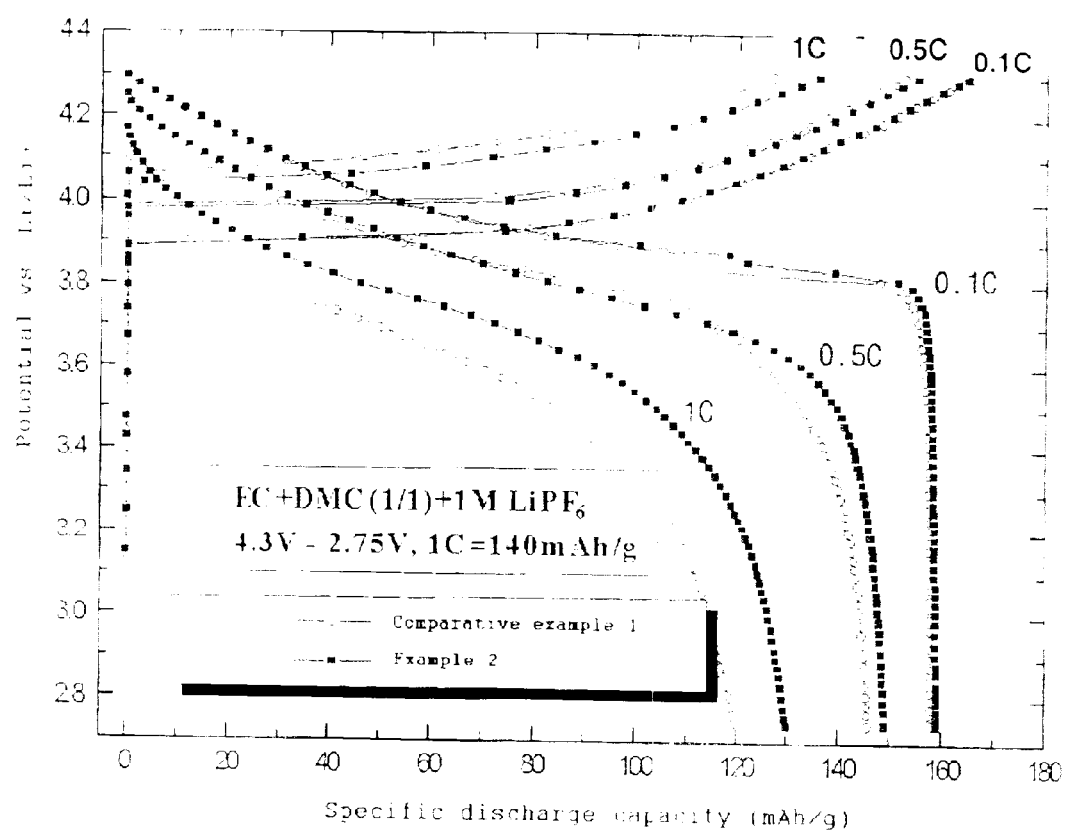
FIG. 1 is a graph showing charge-discharge characteristics at various C-rates of positive electrodes according to Example 2 of an embodiment of the present invention and Comparative Example 1.

Reference will now be made in detail to the present preferred embodiments of the present invention, examples of which are illustrated in the accompanying drawings and in specific Examples, wherein like reference numerals refer to the like elements throughout. The embodiments are described below in order to explain the present invention by referring to the figures and specific Examples.

The present invention relates to a method of preparing a positive electrode for a rechargeable lithium battery having improved capacity, power, and cycle-life characteristics, simply by adding a coating operation to a state-of the art fabrication process of the electrode. The present method includes a first operation of coating a current collector with a positive active material composition to provide a layer of the positive active material on the current collector. The thickness of the layer of the positive active material can be controlled depending upon the type of battery to be obtained.

The positive active material includes a lithiated compound which is selected from the following compounds represented by formulas 1 to 13:

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}MO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13) | wherein;

$0.95 \leq x \leq 1.1$; $0 \leq y \leq 0.5$; $0 \leq z \leq 0.5$; $0 \leq \alpha \leq 2$, M is one selected from the group consisting of Al, Ni, Co, Mn, Cr, Fe, Mg, Sr, V, and rare earth elements, A is selected from the group consisting of O, F, S, and P, and X is selected from the group consisting of F, S, and P.

A slurry of the positive active material composition of an embodiment of the present invention is prepared by suspending and dissolving the positive active material and a binder, respectively, in a solvent. The solvent includes any conventional solvent used for the conventional positive active material composition, such as N-methyl pyrrolidone. The contents of the solvent and the positive active material are not critical in the present invention, but should be sufficient to provide a suitable viscosity so that the composition is readily coated on the current collector.

The binder includes any conventional binder used for a conventional positive active material composition as long as the binder is soluble in the solvent used. An example of a binder includes polyvinylidene fluoride. While not required in all embodiments, the composition further includes a conductive agent to enhance conductivity of the battery. The conductive agent includes any conventional conductive agent that improves the conductivity of the positive active material composition, such as carbon.

The current collector that carries the positive active material composition may be made of any inert electrically conductive material, such as any metal that is reasonably inert in the battery cell environment. A representative example thereof is an Al-foil current collector.

Subsequently, the current collector coated with the positive active material layer is treated with a coating liquid. The coating liquid includes a coating-element source. The coating process according to embodiment of the invention includes one of by a dipping method and a vacuum impregnation method. The dipping method includes the operations of dipping the active material-coated current collector in the coating liquid, removing the dipped current collector from the coating liquid, and drying the removed current collector. The vacuum impregnation method involves impregnation of the coating solution into pores in the active material composition of the coated current collector in a reduced pressure or vacuum environment in order to improve penetration of the coating solution into the pores. Generally, a dip coating method is used since it is the simplest method, but it is understood that the vacuum impregnation method or other methods would be useful in other embodiments of the invention.

By the above method, the layer of the positive active material is impregnated with the coating liquid so that the positive active material in the bulk of the layer as well as the positive active material at a surface of the layer is coated with the coating liquid. When adopting the dip-coating method according to an embodiment of the invention, the active material coated current collector is immersed in the coating liquid for 16 to 24 hours so that a suitable thickness, generally at or between 1 and 100 nm, of the surface-treatment layer can be obtained. Within this range of thickness, the lithium ions of the current collector can be readily intercalated.

The coating liquid is prepared by adding a coating-element source to a solvent to form a solution or a suspension according to an embodiment of the invention.

The solvent includes an organic solvent or water. The coating-element source includes any coating-element or any coating-element-included compound soluble in the solvent. The coating element generally includes Mg, Al, Co, K, Na, Ca, Si, Ti, V, Sn, Ge, B, As, or Zr according to an embodiment of the invention, and preferably, one of Al and B.

The coating-element source includes the coating-element, a coating-element-included alkoxide, a coating-element-included salt, or a coating-element-included oxide according to embodiments of the invention. Since the solubility of the coating-element source largely depends upon the type of solvent used, one having ordinary skill in the art can easily choose a suitable coating-element source from the group consisting of the coating element itself, the coating-element-included alkoxide, the coating-element-included salt, or the coating-element-included oxide by considering the type of solvent. For example, the organic solvent is used as the solvent for the coating liquid, the coating element, the coating-element-included alkoxide, the coating-element-included salt, or the coating-element-included oxide may be chosen such that it is dissolved in the organic solvent, using a refluxed method, if necessary. Alternatively, if water is used as the solvent, either the coating-element-included salt or the coating-element-included oxide may be used to prepare the coating liquid. For an example of the coating-element source according to embodiments of the invention, tetraethyl orthosilicate is used as a silicone source, whereas $B_2O_3$, $H_3BO_3$, or $HB(OH)_2$ is used as a boron source, wherein $HB(OH)_2$ is prepared by dissolving $B_2O_3$ in an organic solvent or water followed by drying. When vanadium is used as a coating-element according to an embodiment of the invention, vanadium oxide ($V_2O_5$) or a vanadate such as ammonium vanadate ($NH_4(VO)_3$) may be used.

Examples of the organic solvent include, but are not limited to, an alcohol (such as methanol, ethanol, or isopropanol), hexane, chloroform, tetrahydrofuran, ether, methylene chloride, and acetone.

A concentration of the coating-element source is roughly at or between 0.1 and 50 wt % of the coating solution according to an embodiment of the invention. Preferably, the concentration is at or between 0.1 and 20 wt % of the coating solution. In a case when the concentration thereof is below 0.1 wt %, coating is not fully effective, whereas in a case when the concentration of the coating element source is more than 50 wt %, the thickness of the resultant coating layer is thicker than desired.

Subsequent to the wet coating, the resultant current collect or with the active material layer is dried to form a positive electrode for a rechargeable lithium battery. The drying process is performed in the temperature range at or between room ambient temperature and 200° C. for 1 to 20 hours. If the drying temperature is lower than room temperature, the drying time is unduly long, and if the drying temperature is higher than 200° C., the desired surface-treatment layer is not obtained. If the drying duration is shorter than 1 hour, the electrode is dried insufficiently, while if it is longer than 20 hours, the process time is undesirably long. However, it is understood that other drying temperatures and times may be useful according to a need.

During the drying process, the coating liquid is dried and converted to a coating-element-included hydroxide, a coating-element-included oxyhydroxide, a coating-element-included oxycarbonate, a coating-element-included hydroxycarbonate, or a mixture thereof. The dried coating layer forms an amorphous or a crystalline surface-treatment layer at a surface as well as in the bulk of the positive active material layer. Depending on the processing conditions, the surface-treatment layer contains various mixed compositions of a coating-element-included hydroxide, a coating-element-included oxyhydroxide, a coating-element-included oxycarbonate, and a coating-element-included hydroxycarbonate. For example, if the drying process is performed under carbon dioxide ($CO_2$), the surface-treatment layer may predominantly contain the coating-element-included oxycarbonate or the coating-element-included hydroxycarbonate.

Since the surface-treatment layer may reduce the interfacial resistance between the electrolyte and the active material, the polarization drop of the discharge voltage and the over-voltage on charge, especially at high charge rates (C-rates), will be reduced. Therefore, the present invention is expected to provide a battery having improved power due to improved discharging-voltage characteristics. Such improved characteristics, in turn, will improve battery capacity as well as cycle life.

As a result of the present invention, an addition of a simple treating operation with a coating liquid to the state-of-the-art positive electrode preparation process, improves the resultant battery performance substantially and significantly.

Figure 3:
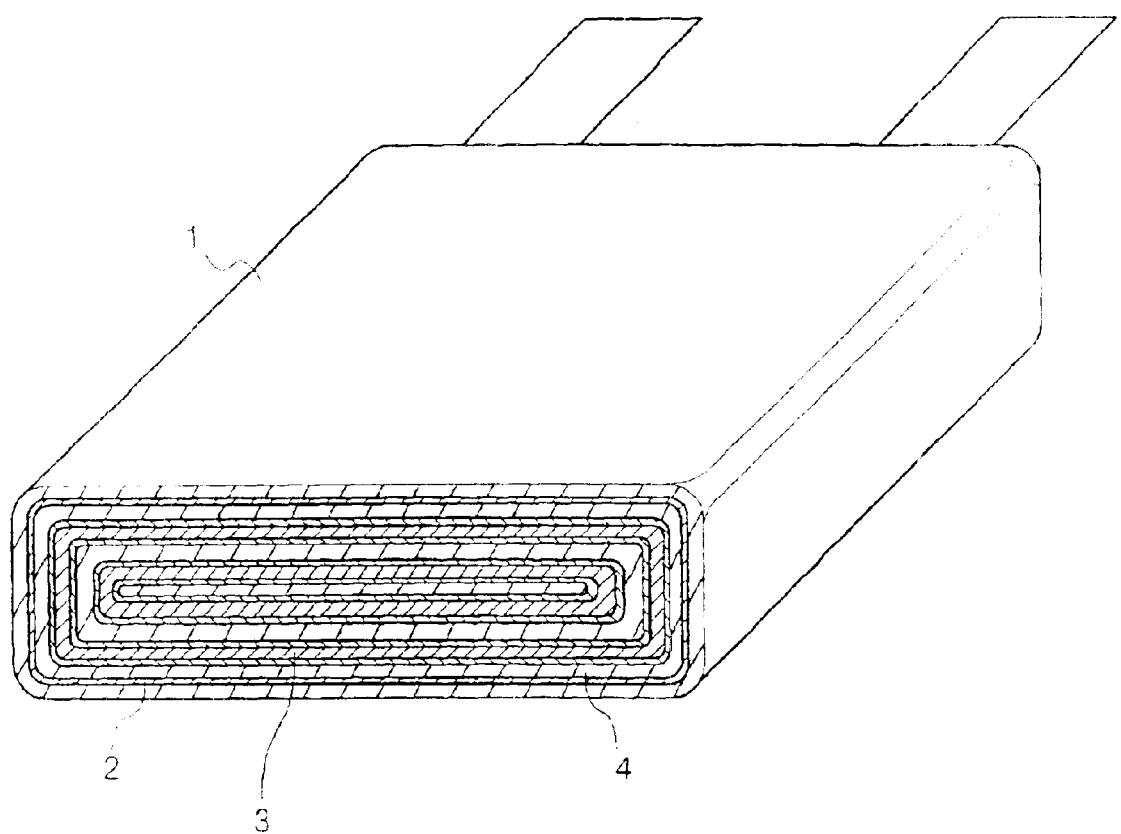
FIG. 3 shows a lithium battery according to an embodiment of the present invention.

A rechargeable lithium battery having a positive electrode 3 manufactured by the above-mentioned method according to an embodiment of the invention is shown in FIG. 3. The positive electrode 3 contains a current collector, a layer of a positive active material coated on a surface on the current collector, and a surface-treatment layer applied to or impregnated in the layer of the positive active material. The surface-treatment layer includes a coating-element-included hydroxide, a coating-element-included oxyhydroxide, a coating-element-included oxycarbonate, a coating-element-included hydroxycarbonate, or a mixture thereof. A thickness of the surface-treatment layer is 1 to 100 nm. If the thickness is less than 1 nm, the effect of the surface-treatment layer on the battery performance is insignificant, whereas if it is more than 100 nm, the thickness is too thick for facilitating the movement of $Li^+$ ions through the coating layer and improving the battery performance.

The lithium battery further includes a case 1 containing the positive electrode 3, a lithium counter electrode 4, and a separator 2 interposed between the positive electrode 3 and the lithium counter electrode 4. However, it is understood that other lithium batteries can be constructed using the positive electrode 3 according to the present invention.

The lithiated compounds represented by the formulas 1 to 13 may be commercially purchased or prepared by one of the following methods according to embodiments of the invention.

Lithium sources are mixed with metal sources in a desirable equivalent ratio. The lithium source includes any lithium salt, examples of which are lithium nitrate, lithium acetate, and lithium hydroxide. The metal sources include manganese sources, cobalt sources, nickel sources, or nickel-manganese sources. Typical examples of the manganese sources are manganese acetate, manganese nitrate, manganese chloride, manganese hydroxide, and manganese dioxide. Typical examples of the cobalt sources are cobalt oxide, cobalt nitrate, cobalt acetate, cobalt chloride, cobalt hydroxide, and cobalt carbonate, whereas typical examples of the nickel sources are nickel hydroxide, nickel nitrate, nickel chloride, nickel oxide, and nickel acetate.

The nickel-manganese sources are produced by co-precipitating nickel and manganese salts, but can be produced according to other processes. Fluoride sources, sulfur sources, or phosphorous sources are used in addition to the manganese sources, cobalt sources, nickel sources, or nickel-manganese sources according to an embodiment, but need not be used in all circumstances. The fluoride sources may be manganese fluoride or lithium fluoride, and the sulfur sources may be manganese sulfide or lithium sulfide. The phosphorous source is a source such as $H_3PO_4$. It should be noted that the above lists of manganese, cobalt, nickel, nickel-manganese, fluoride, sulfur, and phosphorus sources are examples and are not intended to limit the present invention thereto.

In order to facilitate the reaction of the lithium sources and the metal sources, a small amount of solvent such as ethanol, methanol, water, or acetone is added to the mixture according to an embodiment of the invention. The mixture is then subjected to mortar grinding until the liquid form of solvent disappears visibly.

The resulting mixture is heat-treated at about 400 to 600° C. to produce a semi-crystalline precursor powder of positive active material compounds represented by formulas 1 to 13. If the heat-treating temperature is less than 400° C., the metal sources may not react sufficiently with the lithium sources. After drying or heat-treating the precursor powder, the powder of the heat-treated active material precursor is remixed thoroughly while blowing dry air thereon to improve powder uniformity, but need not be remixed in all aspects of the invention.

The powder of the semi-crystalline precursor is heat-treated (the second heat-treating operation) again at about 700 to 900° C. for about 10 to 15 hours to produce a powder of a crystalline positive active material. If the second heat-treating temperature is below 700° C., conversion of the precursor to a crystalline material may not be sufficient. According to an embodiment of the invention, the heating operation is performed by increasing the temperature at the rate of 1 to 5° C. /min while blowing dry air or oxygen through the mixture. The mixture is allowed to stand at the first and second heat-treating temperature for a predetermined period of time, respectively, after which the mixture is passively cooled.

According to another embodiment of the present invention, the powder of the prepared compound with the composition selected from the group consisting of compounds represented by formulas 1 to 13 is further mixed thoroughly at room temperature, to improve powder uniformity.

The following examples illustrate the present invention in further detail. However, it is understood that the present invention is not limited by these examples.

EXAMPLE 1

A $LiCoO_2$ positive active material powder, a carbon conductive agent, and a polyvinylidene fluoride binder in a weight ratio of 94:3:3 were mixed with an appropriate amount of N-methyl pyrrolidone solvent to obtain a positive active material slurry. The positive active material slurry was cast on an Al foil so as to coat the Al foil with a layer of the positive active material. The positive active material layer was dried to prepare a positive electrode precursor film.

The resultant positive electrode precursor film was dipped in a 0.1% Al-isopropoxide ethanol suspension, removed from the solution, and dried in an oven at 50° C. for 10 hours to provide a coated positive electrode for a rechargeable lithium battery. The 0.1% Al-isopropoxide ethanol suspension was prepared by dissolving 0.1 wt % Al-isopropoxide powder in an ethanol solvent.

Using the prepared positive electrode and a lithium counter electrode, a coin-type half-cell was fabricated in an Ar-purged glove box. For an electrolyte, a 1 M $LiPF_6$ solution of ethylene carbonate and dimethyl carbonate (1:1 volume ratio) was used.

EXAMPLE 2

A coin-type half-cell was fabricated by the same procedure as in Example 1, except that a 1% Al-isopropoxide ethanol suspension was used instead of a 0.1% Al-isopropoxide ethanol suspension, and the drying process was performed at 80° C. instead of at 50° C.

EXAMPLE 3

A coin-type half-cell was fabricated by the same procedure as in Example 1, except that a 5% Al-isopropoxide ethanol suspension was used instead of a 0.1% Al-isopropoxide ethanol suspension, and the drying process was performed at 100° C. instead of at 50° C.

EXAMPLE 4

A coin-type half-cell was fabricated by the same procedure as in Example 1, except that a 10% Al-isopropoxide ethanol suspension was used instead of a 0.1% Al-isopropoxide ethanol suspension, and the drying process was performed at 100° C. instead of at 50° C.

EXAMPLE 5

A coin-type half-cell was fabricated by the same procedure as in Example 1, except that a 1% tetraethylorthosilicate ethanol suspension prepared by diluting 98% tetraethylorthosilicate with ethanol was used instead of a 0.1% Al-isopropoxide ethanol suspension, and the drying process was performed at 80° C. instead of at 50° C.

EXAMPLE 6

A coin-type half-cell was fabricated by the same procedure as in Example 1, except that a 1% tetraethylorthosilicate suspension prepared by diluting 98% tetraethylorthosilicate with ethanol was used instead of a 0.1% Al-isopropoxide ethanol suspension, and the drying process was performed at 100° C. instead of at 50° C.

EXAMPLE 7

A coin-type half-cell was fabricated by the same procedure as in Example 1, except that a 0.1% aluminum nitrate suspension prepared by dissolving $Al(NO_3)_3$ in water was used instead of a 0.1% Al-isopropoxide ethanol suspension.

EXAMPLE 8

A coin-type half-cell was fabricated by the same procedure as in Example 2, except that a 1% aluminum nitrate suspension prepared by dissolving $Al(NO_3)_3$ in water was used instead of a 1% Al-isopropoxide ethanol suspension.

EXAMPLE 9

A coin-type half-cell was fabricated by the same procedure as in Example 2, except that a 3% aluminum nitrate suspension prepared by dissolving $Al(NO_3)_3$ in water was used instead of a 1% Al-isopropoxide ethanol suspension.

EXAMPLE 10

A coin-type half-cell was fabricated by the same procedure as in Example 2, except that a 5% aluminum nitrate suspension prepared by dissolving $Al(NO_3)_3$ in water was used instead of a 1% Al-isopropoxide ethanol suspension.

EXAMPLE 11

A coin-type half-cell was fabricated by the same procedure as in Example 2, except that a 10% aluminum nitrate suspension prepared by dissolving $Al(NO_3)_3$ in water was used instead of a 1% Al-isopropoxide ethanol suspension.

EXAMPLE 12

A coin-type half-cell was fabricated by the same procedure as in Example 1, except that a $BH(OH)_2$ suspension prepared by dissolving 0.1 wt % $B_2O_3$ powder in ethanol was used instead of a 0.1% Al-isopropoxide ethanol suspension.

EXAMPLE 13

A coin-type half-cell was fabricated by the same procedure as in Example 1, except that a $BH(OH)_2$ suspension prepared by dissolving 10 wt % $B_2O_3$ powder in ethanol was used instead of a 0.1% Al-isopropoxide ethanol suspension.

COMPARATIVE EXAMPLE 1

A $LiCoO_2$ positive active material powder, a carbon conductive agent, and a polyvinylidene fluoride binder in a weight ratio of 94:3:3 were mixed with an appropriate amount of N-methyl pyrrolidone solvent to obtain a positive active material slurry. The positive active material slurry was cast on an Al foil, dried, and compressed to prepare a positive electrode.

Using the prepared positive electrode and a lithium counter electrode, a coin-type cell was fabricated in an Ar-purged glove box. For an electrolyte, a 1 M LiPF$_6$ solution of ethylene carbonate and dimethyl carbonate (1:1 volume ratio) was used.

FIG. 1 shows a graph illustrating the charge-discharge characteristics at various C-rates (charge and discharge rates) for the test cells of Example 2 of an embodiment of the present invention and Comparative Example 1. As shown in FIG. 1, the charge-discharge characteristic of the coin-type half-cell of Example 2 is similar to that of Comparative Example 1 at a low rate (0.1 C), but as the rate was increased (1 C), the performance characteristics for Example 2 became distinctly better than ones for Comparative Example 1.

Tables 1 and 2 respectively show a specific discharge capacity and the midpoint discharge voltage at various charge and discharge rates.

TABLE 1

| Discharge capacity (mAh/g) | | | |
|---|---|---|---|
|  | 0.1 C | 0.5 C | 1 C |
| Comparative Example 1 | 158 | 146 | 120 |
| Example 2 | 159 | 149 | 130 |

TABLE 2

| Midpoint discharge voltage (V) | | | |
|---|---|---|---|
|  | 0.1 C | 0.5 C | 1 C |
| Comparative Example 1 | 3.92 | 3.84 | 3.64 |
| Example 2 | 3.92 | 3.84 | 3.73 |

As shown in Tables 1 and 2, at high rates, the coin-type half-cell of Example 2 showed improved discharge capacity and enhanced discharge voltage over the cell of Comparative Example 1, which indicates improvements in the specific energy and power of a battery by using the positive electrode according to an embodiment of the present invention.

Figure 2:
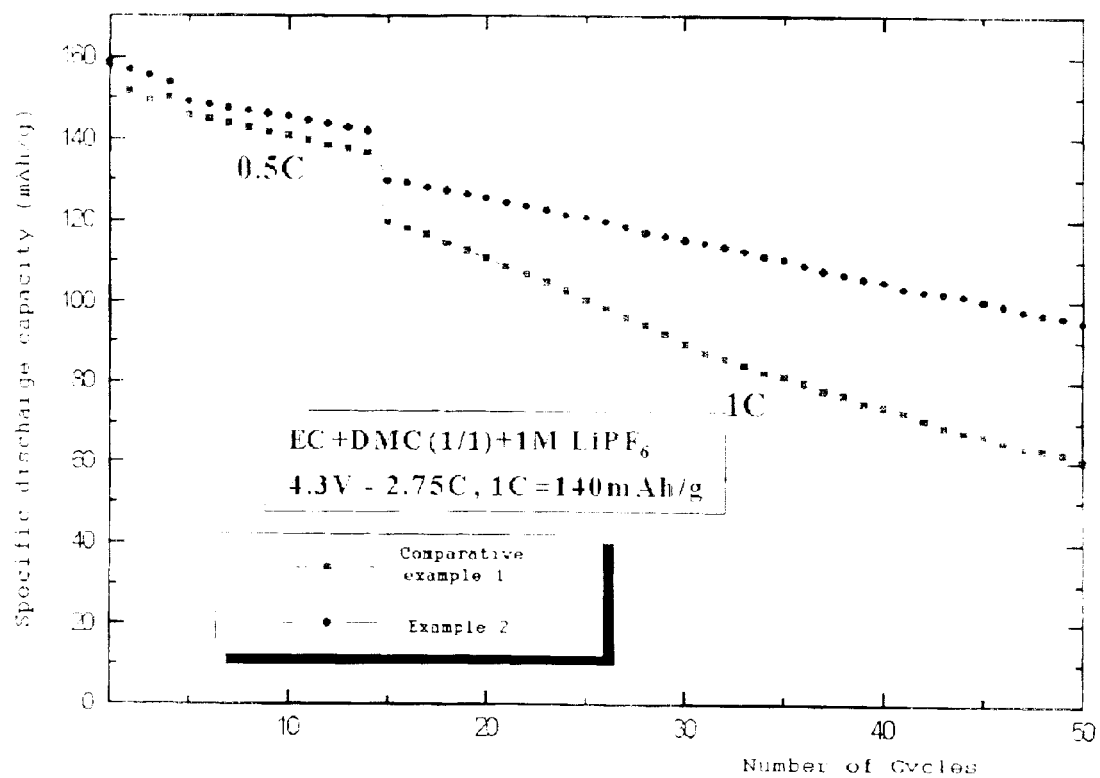
FIG. 2 is a graph showing cycle-life characteristics of positive electrodes according to Example 2 of an embodiment of the present invention and Comparative Example 1.

FIG. 2 shows the cycle-life characteristics of Example 2 of the present invention and Comparative Example 1. The cycle-life characteristics were measured at various charge and discharge rates. Specifically, the cycle-life characteristics were measured at 0.1 C rate for the first cycle, 0.2 C rate for the subsequent 3 cycles, 0.5 C rate for the next 10 cycles, and 1 C rate for the last 36 cycles. As shown in FIG. 2, the coin-type half-cell of Example 2 shows improved cycle-life characteristics, especially at high rates, over those of Comparative Example 1. In addition, the coin-type half-cells of Examples 1 and 3–13 also exhibited significantly improved performance characteristics over those of Example 2

As mentioned above, the positive electrode for the rechargeable lithium battery of the present invention has a surface-treatment layer which improves the capacity, the power, and the cycle-life characteristics of the battery, especially at high charge and discharge rates. In addition, the positive electrode can be fabricated by a simple method so that the electrode can be mass-produced economically.

While the present invention has been described in detail with reference to the preferred embodiments, those skilled in the art will appreciate that various modifications and substitutions can be made thereto without departing from the spirit and scope of the present invention as set forth in the appended claims and equivalents thereof.

What is claimed is:

1. A positive electrode for a rechargeable lithium battery, comprising:

a current collector, a positive active material layer coated on said current collector, said positive active material layer comprising a positive active material; and a surface-treatment layer on said positive active material layer such that said positive active material layer is disposed between said surface-treatment layer and said current collector, said surface treatment layer comprising a compound selected from the group consisting of a coating-element-included hydroxide, a coating-element-included oxyhydroxide, a coating-element-included oxycarbonate, and a coating-element-included hydroxycarbonate, wherein:

the surface-treatment layer comprises a coating-element selected from the group consisting of Mg, Al, Co, K, Na, Ca, Si, Ti, Sn, V, Ge, Ga, B, As, and Zr, said positive active material comprises a lithiated compound selected from the group consisting of compounds represented by the formulas 1 to 13:

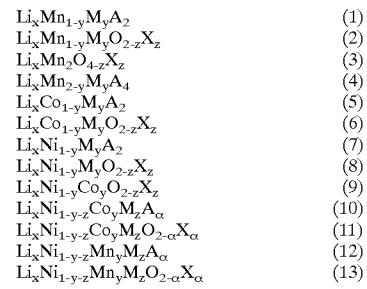

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}M_yO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13) |

$0.95 \leq x \leq 1.1$; $0 \leq y \leq 0.5$; $0 \leq z \leq 0.5$; $0 \leq \alpha \leq 2$, M is one element selected from the group consisting of Al, Ni, Co, Mn, Cr, Fe, Mg, Sr, V, and rare earth elements, A is selected from the group consisting of O, F, S, and P, and X is selected from the group consisting of F, S, and P.

2. The positive electrode according to claim 1, wherein said surface-treatment layer is formed by coating the positive active material layer with a coating solution.

3. The positive electrode according to claim 2, wherein the coating process includes one of a dipping method and a vacuum impregnation method.

4. A method of preparing a positive electrode for a rechargeable lithium battery, comprising:

treating the current collector, which is coated with a layer of a positive active material, with a coating liquid, the coating liquid comprising one of a coating element and a coating-element-included compound; and drying the treated current collector to form a surface treatment layer comprising one of a coating-element-include hydroxide, a coating-element-include oxyhydroxide, a coating-element-included oxycarbonate, and a coating-element-included hydroxidecarbonate, wherein:
the coating element in the surface treatment layer comprises one of Mg, Al, Co, K, Na, Ca, Si, Ti, V, Sn, Ge, B, As, and Zr, the positive active material comprises a lithiated compound selected from the group consisting of compounds represented by the formulas 1 to 13:

$$Li_xMn_{1-y}M_yA_2 \quad (1)$$
$$Li_xMn_{1-y}M_yO_{2-z}X_z \quad (2)$$
$$Li_xMn_2O_{4-z}X_z \quad (3)$$
$$Li_xMn_{2-y}M_yA_4 \quad (4)$$
$$Li_xCo_{1-y}M_yA_2 \quad (5)$$
$$Li_xCo_{1-y}M_yO_{2-z}X_z \quad (6)$$
$$Li_xNi_{1-y}M_yA_2 \quad (7)$$
$$Li_xNi_{1-y}M_yO_{2-z}X_z \quad (8)$$
$$Li_xNi_{1-y}Co_yO_{2-z}X_z \quad (9)$$
$$Li_xNi_{1-y-z}Co_yM_zA_\alpha \quad (10)$$
$$Li_xNi_{1-y-z}Co_yM_zO_{2-\alpha}X_\alpha \quad (11)$$
$$Li_xNi_{1-y-z}Mn_yM_zA_\alpha \quad (12)$$
$$Li_xNi_{1-y-z}Mn_yM_zO_{2-\alpha}X_\alpha \quad (13)$$

$0.95 \leq x \leq 1.1; 0 \leq y \leq 0.5; 0 \leq z \leq 0.5; 0 \leq \alpha \leq 2$, M Is one element selected from the group consisting of Al, Ni, Co, Mn, Cr, Fe, Mg, Sr, V, and rare earth elements, A is selected from the group consisting of O, F, S, and P, and X is selected from the group consisting of F, S, and P.

5. The method of claim 4, wherein said drying the treated current collector comprises drying the treated current collector to form one of an amorphous and a crystalline surface treatment layer.

6. The method according to claim 4, wherein a concentration of the coating element in the coating liquid at or between 0.1 and 50%.

7. The method according to claim 4, wherein said treating the current collector comprises dipping or vacuum-impregnating the current collector in the coating liquid.

8. The method of claim 4, wherein a concentration of the coating element in the coating element liquid is at or between 0.1% and 20 wt % of the coating liquid.

9. The method of claim 8, wherein said treating the current collector comprises coating the current collector to form a surface treatment layer having a thickness at or between 1 and 100 nm.

10. The method of claim 4, wherein said treating the current collector comprises:
immersing the current collector in the coating liquid to form a surface treatment layer having a thickness at or between 1 and 100 nm, and
removing the current collector from the coating liquid to be dried.

11. The method of claim 4, wherein said treating the current collector comprises inserting the current collector coated with the coating liquid in a reduced pressure environment in order to impregnate the coating liquid in pores of positive active material layer to form a surface treatment layer having a thickness at or between 1 and 100 nm.

12. The method of claim 4, wherein said drying comprises drying at a temperature at or between 20° C. and 200° C. for at or between 1 to 20 hours.

13. A method of preparing a positive electrode for a rechargeable lithium battery, comprising:

coating a current collector with a positive active material composition to form a positive active material layer, the positive active material composition comprising a positive active material selected from the group consisting of lithium chalcogenide, lithium-cobalt chalcogenide, lithium-manganese chalcogenide, lithium-nickel chalcogenide and lithium-nickel-manganese chalcogenide;

dipping the current collector having the positive active material layer in a liquid, the liquid comprising one of Al and B; and drying the treated current collector.

14. The method according to claim 13, wherein a concentration of the liquid is at or between 0.1 and 50%.

15. The method according to claim 13, wherein said drying the treated current collector is performed at a temperature at or between room ambient temperature and 200° C. for 1 to 20 hours.

16. A method of preparing a positive electrode for a rechargeable lithium battery, comprising:

coating a current collector with a positive active material composition to form a positive active material layer, the positive active material composition comprising a $LiCoO_2$ positive active material;

dipping the current collector having the positive active material layer in a coating liquid, the coating liquid comprising one of Al and B; and drying the treated current collector.

17. The method according to claim 16, wherein the concentration of the liquid is at or between 0.1 and 50%.

18. The method according to claim 16, wherein said drying the treated current collector is performed at or between room ambient temperature and 200° C. for at or between 1 and 20 hours.

19. A positive electrode for a rechargeable lithium battery, comprising:

a current collector;

a positive active material layer coated on said current collector, said positive active material layer comprising a positive active material selected from the group consisting of lithium-cobalt chalcogenide, lithium-manganese chalcogenide, lithium-nickel chalcogenide and lithium-nickel-manganese chalcogenide; and a surface-treatment layer on said positive active material layer such that the positive active material is disposed between the surface-treatment layer and the current collector, said surface treatment layer comprising a compound selected from the group consisting of a coating-element-included hydroxide, a coating-element-included oxyhydroxide, a coating-element-included oxycarbonate, and a coating-element-included hydroxycarbonate, wherein the coating-element is one Al and B.

20. A positive electrode for a rechargeable lithium battery, comprising:

a current collector;

a positive active material layer coated on said current collector, said positive active material layer comprising a $LiCoO_2$ positive active material; and a surface-treatment layer disposed on said positive active material layer such that the positive active material is disposed between the surface-treatment layer and the current collector, said surface treatment layer comprising a compound selected from the group consisting of a coating-element-include hydroxide, a coating-element-included hydroxycarbonate, a coatingelement-included oxycarbonate, and a coating-element-included hydroxycarbonate, wherein the coating-element is one of Al and B.

21. A lithium battery comprising:

a first electrode comprising a current collector, a first layer of a lithiated compound, and a surface treatment layer coating the first layer such that the first layer is between the surface treatment layer and the current collector, the surface treatment layer comprising one of a coating-element-included hydroxide, a coating-element-included oxyhydroxide, a coating-element-included oxycarbonate, a coating-element-included hydroxidecarbonate;

a second electrode comprising a material to reversibly intercalate lithium ions; and a separator and an electrolyte disposed between said first and second electrodes, wherein the coating element in the surface treatment layer comprises one of Mg, Al, Co, K, Na, Ca, Si, Ti, V, Sn, Ge, B, As, and Zr.

22. The lithium battery of claim 21, wherein the surface treatment layer has a thickness of at or between 1 and 100 nm.

23. The lithium battery of claim 21, wherein seed first electrode is prepared in accordance with a method comprising:

treating a current collector, which is coated with a layer of a positive active material, with a coating liquid, the coating liquid comprising one of a coating element and a coating-element-included compound; and drying the treated current collector to form the surface treatment layer comprising one of the coating-element-included hydroxide, the coating-element-included oxyhydroxide, the coating-element-included oxycarbonate, and the coating-element-included hydroxidecarbonate.

* * * * *

UNITED STATES PATENT AND TRADEMARK OFFICE
CERTIFICATE OF CORRECTION

PATENT NO.     : 6,846,592 B2
DATED          : January 25, 2005
INVENTOR(S)    : Ho-jin Kweon et al.

It is certified that error appears in the above-identified patent and that said Letters Patent is hereby corrected as shown below:

Column 10,
Line 46, change "$0 \leq \geq \leq 0.5$" to -- $0 \leq z \leq 0.5$ --.
Line 67, change "include hydroxide" to -- included hydroxide --, and change "coating-element-include" to -- coating-element-included --.

Column 11,
Line 25, change "$0 \leq \geq \leq 0.5$" to -- $0 \leq z \leq 0.5$ --.
Line 26, change "Is" to -- is --.

Column 12,
Line 66, change "coating-element-include" to -- coating-element-included --,
Line 67, change "hydroxycarbonate" to -- oxyhydroxide --.

Column 14,
Line 4, change "seed" to -- said --.

Signed and Sealed this

Thirty-first Day of May, 2005

JON W. DUDAS
*Director of the United States Patent and Trademark Office*